US010999097B2

(12) United States Patent
den Besten

(10) Patent No.: US 10,999,097 B2
(45) Date of Patent: May 4, 2021

(54) APPARATUSES AND METHODS INVOLVING FIRST TYPE OF TRANSACTION REGISTERS MAPPED TO SECOND TYPE OF TRANSACTION ADDRESSES

(71) Applicant: NXP B.V., Eindhoven (NL)

(72) Inventor: Gerrit Willem den Besten, Eindhoven (NL)

(73) Assignee: NXP B.V., Eindhoven (NL)

(*) Notice: Subject to any disclaimer, the term of this patent is extended or adjusted under 35 U.S.C. 154(b) by 0 days.

(21) Appl. No.: 16/456,111

(22) Filed: Jun. 28, 2019

(65) Prior Publication Data

US 2020/0412572 A1 Dec. 31, 2020

(51) Int. Cl.
*H04L 12/40* (2006.01)
*H04L 29/12* (2006.01)
*H04L 29/06* (2006.01)

(52) U.S. Cl.
CPC .. *H04L 12/40032* (2013.01); *H04L 12/40019* (2013.01); *H04L 61/25* (2013.01); *H04L 69/22* (2013.01)

(58) Field of Classification Search
CPC ......... H04L 12/40019; H04L 12/40032; H04L 61/25; H04L 69/22
See application file for complete search history.

(56) References Cited

U.S. PATENT DOCUMENTS

| 5,598,545 A | 1/1997 | Childers et al. |
| 5,603,013 A | 2/1997 | Ohara |
| 6,215,816 B1 | 4/2001 | Gillespie et al. |
| 7,511,530 B1 | 3/2009 | Cox et al. |
| 8,631,483 B2 | 1/2014 | Soni et al. |
| 9,083,784 B2 | 7/2015 | Ku et al. |
| 9,455,713 B1 | 9/2016 | Kadkol |

(Continued)

FOREIGN PATENT DOCUMENTS

JP 2015 035780 A 2/2015

OTHER PUBLICATIONS

IEEE Standard for Ethernet, IEEE 802.3-2018, Clauses 22 and 45 (abstract only).

(Continued)

*Primary Examiner* — Jason D Recek
(74) *Attorney, Agent, or Firm* — Rajeev Madnawat

(57) ABSTRACT

An example apparatus includes a discernment logic circuit and logic circuitry. The discernment logic circuit discerns whether a requested communications transaction received over the management communications bus from another of the plurality of logic nodes involves a first type of transaction or a second type of transaction. The second type of transaction has a plurality of commands associated with the requested communication transaction to convey respectively different parts of the requested communications transaction including an address part and a data part. The logic circuitry accesses, in response to discerning that the requested communications transaction involves the second type of transaction, a register of the plurality of registers associated with the first type of transaction, wherein the plurality of registers associated with the first type of transaction are mapped into a set of addresses for the second type of transaction.

20 Claims, 8 Drawing Sheets

(56) References Cited

U.S. PATENT DOCUMENTS

| | | | |
|---|---|---|---|
| 10,747,538 B2 | 8/2020 | Mouchel La Fosse et al. | |
| 2002/0124007 A1 | 9/2002 | Zhao | |
| 2011/0096930 A1 | 4/2011 | Walmsley | |
| 2013/0002290 A1 | 1/2013 | Gondi et al. | |
| 2013/0106491 A1 | 5/2013 | Ryu | |
| 2014/0181845 A1 | 6/2014 | Jing et al. | |
| 2019/0104088 A1 | 4/2019 | Qin et al. | |
| 2019/0205244 A1* | 7/2019 | Smith | G06F 12/12 |
| 2019/0361708 A1 | 11/2019 | Soe et al. | |
| 2020/0201637 A1* | 6/2020 | Mouchel La Fosse | G06F 9/3836 |
| 2020/0272474 A1 | 8/2020 | Gabor et al. | |
| 2020/0409706 A1 | 12/2020 | den Besten | |
| 2020/0409884 A1 | 12/2020 | den Besten | |
| 2020/0409976 A1 | 12/2020 | den Besten | |
| 2020/0412368 A1 | 12/2020 | den Besten | |

OTHER PUBLICATIONS

Open Alliance, TC10 Wake-up and Sleep Specification for Automotive Ethernet.

Yue Lu, Kwangmo Jung, Yasuo Hidaka, Elad Alon, "Design and Analysis of Energy-Efficient Reconfigurable Pre-Emphasis Voltage-Mode Transmitters," in IEEE Journal of Solid-State Circuits, vol. 48, No. 8, Aug. 2013 (abstract only).

Non-Final Rejection for U.S. Appl. No. 16/457,287, 6 pgs. (dated Nov. 13, 2020).

U.S. Appl. No. 16/456,467, filed Jun. 28, 2019, entitled: Apparatuses and Methods Involving Selective Disablement of Side Effects Caused by Accessing Register Sets. The Examiner is referred to the copending patent prosecution of the common Applicant (no attachment).

U.S. Appl. No. 16/456,206, filed Jun. 28, 2019, entitled: Apparatuses and Methods Involving Synchronization Using Data in the Data/Address Field of a Communications Protocol. The Examiner is referred to the copending patent prosecution of the common Applicant (no attachment).

U.S. Appl. No. 16/457,287, filed Jun. 28, 2019, entitled: Apparatuses and Methods Involving Disabling Address Pointers. The Examiner is referred to the copending patent prosecution of the common Applicant (no attachment).

U.S. Appl. No. 16/456,236, filed Jun. 28, 2019, entitled: Apparatuses and Methods Involving a Segmented Source-Series Terminated Line Driver. The Examiner is referred to the copending patent prosecution of the common Applicant (no attachment).

Notice of Allowance for U.S. Appl. No. 16/456,467, 9 pgs. (dated Jan. 22, 2021).

Notice of Allowance for U.S. Appl. No. 16/457,287, 7 pgs. (dated Nov. 27, 2020).

Notice of Allowance for U.S. Appl. No. 16/456,236, 9 pgs. (dated Dec. 4, 2020).

Notice of Allowance for U.S. Appl. No. 16/457,287, 6 pgs. (dated Mar. 3, 2021).

* cited by examiner

| | MANAGEMENT FRAME FIELDS | | | | | | | |
|---|---|---|---|---|---|---|---|---|
| | PRE | ST | OP | PHYAD | REGAD | TA | DATA | IDLE |
| READ | 1...1 | 01 | 10 | AAAAA | RRRRR | Z0 | DDDDDDDDDDDDDDDD | Z |
| WRITE | 1...1 | 01 | 01 | AAAAA | RRRRR | 10 | DDDDDDDDDDDDDDDD | Z |

MANAGEMENT FRAME FIELDS — 226

| FRAME | PRE | ST | OP | PRTAD | DEVAD | TA | ADDRESS/DATA | IDLE |
|---|---|---|---|---|---|---|---|---|
| ADDRESS | 1...1 | 00 | 00 | PPPPP | EEEEE | 10 | AAAAAAAAAAAAAAAA | Z |
| WRITE | 1...1 | 00 | 01 | PPPPP | EEEEE | 10 | DDDDDDDDDDDDDDDD | Z |
| READ | 1...1 | 00 | 11 | PPPPP | EEEEE | Z0 | DDDDDDDDDDDDDDDD | Z |
| POST-READ-INCREMENT-ADDRESS | 1...1 | 00 | 10 | PPPPP | EEEEE | Z0 | DDDDDDDDDDDDDDDD | Z |

FIG. 2D

APPARATUSES AND METHODS INVOLVING FIRST TYPE OF TRANSACTION REGISTERS MAPPED TO SECOND TYPE OF TRANSACTION ADDRESSES

OVERVIEW

Aspects of various embodiments are directed to apparatuses having registers of a first type of transaction mapped into addresses of a second transaction type, and methods of accessing the same.

Local area networks (LANs) are a means by which many network modules or work stations are interconnected so as to share resources such as data and applications, providing considerable cost savings over, for example, a mainframe computer with multiple attached terminals, and providing other benefits as well. An example LAN arrangement is the so-called "Ethernet" LAN, which is defined by an industry compliant standard, namely, the Institute of Electrical and Electronic Engineer (IEEE) 802.3 standard. This standard allows network devices of various manufacturers, such as network interface cards (NICs), hubs, bridges, routers, and switches, to communicate packetized data with each other in the LAN. The IEEE 802.3 standard is defined in terms of the Open Systems Interconnection (OSI) reference model. This model defines a data communication system in terms of layers. Among the layers included in the OSI model are: (1) the physical layer (PHY), which specifies the electrical and coding characteristics of the transmission medium; (2) the medium access control (MAC) layer, which controls flow of data through the network; and (3) the network layer, which sets up connections between sources and destinations for data communicated in the network. Other layers include the transport layer, which is a protocol stack for transporting the data, and the application layer, such as a word-processor or spread sheet application.

These and other matters have presented challenges to efficiencies of mapped register implementations, for a variety of applications.

SUMMARY

Various example embodiments are directed to issues such as those addressed above and/or others which may become apparent from the following disclosure concerning mapping registers of a first type of transaction to a set of addresses of a second type of transaction.

In certain example embodiments, aspects of the present disclosure involve registers of a direct address set that are mapped into an indirect address set and which may be accessed using commands associated with either the first type of transaction or the second type of transaction.

In a more specific example embodiment, an apparatus includes a discernment logic circuit and logic circuitry. The apparatus is for use in a local area network (LAN) characterized by a plurality of network modules configured to convey data over a physical communication channel. At least one of the network modules includes a management communications bus for communication among a plurality of logic nodes (e.g., masters and slaves) via a communication protocol. The discernment logic circuit and logic circuitry is at or forms part of one of the plurality of logic nodes. The discernment logic circuit discerns whether a requested communications transaction received over the management communications bus involves a first type of transaction or a second type of transaction. The second type of transaction has or is associated with a plurality of commands to convey respectively different parts of the communications transaction including an address part and a data part. The second type of transaction is different than the first type in that the second type permits for more registers to be accessed within one of the plurality of logic nodes as compared to the first type. The logic circuitry accesses, in response to discerning the requested communications transaction involves the second type of transaction, a register of a plurality of registers associated with the first type of transaction, wherein the plurality of registers associated with the first type of transaction are mapped into a set of addresses for the second type of transaction. For example, the logic circuitry uses or accesses a register map that identifies the addresses of the registers of the first type of transaction as stored in the set of addresses for the second type of transaction. The logic circuitry accesses the one of the registers associated with the first type of transaction and which is stored in the set of addresses for the second type of transaction in response to the requested communications transaction being in accordance with the second type of transaction and based on the (register) map.

The apparatus may further include the management communications bus for communication among the plurality of nodes. Respective addresses for the plurality of logic nodes and the respective registers are conveyed using the management communications bus. In specific embodiments, the first type of transaction provides access to up to N register in each of the M plurality of logic nodes, N and M being positive numbers. The second type of transaction provides access to the M plurality of registers in each of the plurality of logic nodes that is greater than N. The discernment logic circuit may discern whether the requested communications transaction involves the plurality of commands of the second type of transaction and uses a register map that includes another set of addresses for the plurality of registers of the first type of transaction mapped into the set of addresses for second type of transaction to access the register.

The logic circuitry may provide access to registers associated with the first and second type of transactions. The registers of the second type are stored in the set of addresses associated with the second type of transactions. The registers of the first type of transaction, which are associated with another set of addresses, are stored in the set of addresses associated with the second type of transaction. As described above, one or more of the logic nodes include registers for the first type of transaction mapped into the set of addresses for the second type of transaction by an offset from another set of addresses for the first type of transaction. The offset includes a set value for each of the addresses of registers of the first type of transaction (e.g., 0x8000 to 0x801F).

The logic circuitry accesses the registers associated with the first type of transaction in response to commands associated with the first type of transaction and commands associated with the second type of transaction. For example, the logic circuitry is to re-map, in response to discerning another requested communications transaction involves the command associated with the first type of transaction, an address from the other requested communications transaction into the set of addresses for the second type of transaction, the address being associated with another set of addresses for the first type of transaction. In other specific embodiments, discernment logic circuit includes a management controller to provide a Transaction Instruction Code (TRIC) that conveys different types of transactions over an internal interface of the logic node to registers.

In various embodiments, the apparatus includes the plurality of logic nodes. The plurality of logic nodes include a master logic node and at least one slave logic node, and the discernment logic circuit is part of the at least one slave logic node. Each of the first type and the second type of transactions are associated with the communication protocol that is compliant with an industry standard that defines an Ethernet-based LAN technology.

In another specific embodiment, the apparatus is for use with a LAN as described above and includes, at one of the plurality of logic nodes, a discernment logic circuit and logic circuitry. The discernment logic circuit discerns whether a requested communications transaction received over the management communications bus from another of the plurality of logic nodes involves a first type of transaction or a second type of transaction. The second type of transaction has or is associated with a plurality of commands to convey respectively different parts of the requested communications transaction including an address part and a data part. The second type of transaction is different than the first type in that the second type permits for more registers to be accessed within the one of the plurality of logic nodes. The logic circuitry accesses, in response to discerning that the requested communications transaction involves the plurality of commands associated with the second type of transaction, a register of a plurality of registers associated with the first type of transaction, wherein the plurality of registers of the first type of transaction are mapped into a set of addresses for the second type of transaction (e.g., Clause 22 registers mapped into Clause 45 space). The logic circuit further re-maps, in response to discerning that the requested communications transaction involves a command associated with the first type of transaction, an address from the requested communications transaction into the set of addresses for the second type of transaction, the address being associated with another set of addresses for the first type of transaction.

In further and specific embodiments, the logic circuitry provides access to the register associated with the first type of transaction that is management data input/output-managed device number (MMD) agnostic. The logic circuitry is to instantiate up to N registers on the one of the plurality of logic nodes once per port address. As described above, the first type of transaction provides access to a first plurality of registers in each of the plurality of logic nodes using the command which includes the address, the first plurality of registers being associated with the other set of addresses. The second type of transaction provides access to a second plurality of registers in each of the plurality of logic nodes using the plurality of commands, the second plurality of registers being associated the set of addresses and including the first plurality of registers. The first plurality of registers for the first type of transaction (e.g., Clause 22) are mapped into the set of addresses for the second type of transaction (e.g., Clause 45) by an offset value from the other set of addresses for the first type of transaction. The offset value includes a set value for each of the registers of the first type of transaction and the logic circuitry is to re-map the address using the offset value.

A number of embodiments are directed to methods of using the above-described apparatuses. An example method includes communicating over the management communication bus among the plurality of logic nodes associated with a network module. The method further includes, at one of the plurality of logic nodes, discerning whether a requested communications transaction received over the management communications bus from another of the plurality of logic nodes involves a first type of transaction or a second type of transaction. The second type of transaction has a plurality of commands to convey respectively different parts of the requested communications transaction including an address part and a data part. The method further includes accessing, in response to discerning that the requested communications transaction involves the plurality of commands associated with the second type of transaction, a register of the plurality of registers associated with the first type of transaction based on the address part of the communications transaction, wherein the plurality of registers associated with the first type of transaction are mapped into a set of addresses for the second type of transaction. In specific embodiments, the method further includes re-mapping, in response to discerning that the requested communications transaction involves a command associated with the first type of transaction, an address in the requested communications into the set of addresses for the second type of transaction, wherein the address is associated with another set of addresses for the first type of transaction.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIGS. 2A-2D illustrate example circuitry and commands of the first and second type of transaction for an apparatus, in accordance with the present disclosure;

Figure 1:
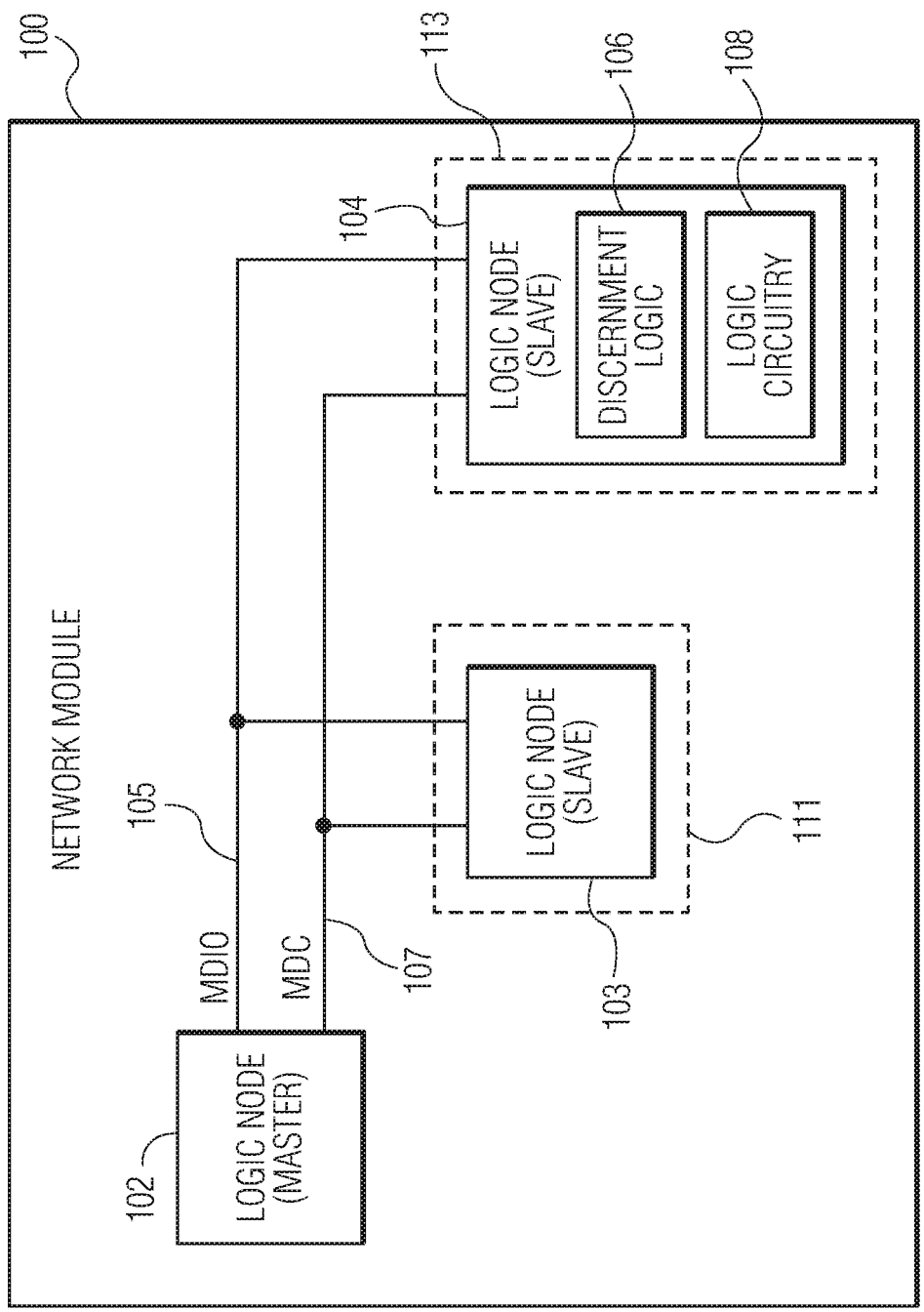
FIG. 1 illustrates an example apparatus, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving registers associated with a first type of transaction that are mapped into addresses of a second type of transaction. In certain implementations, aspects of the present disclosure have been shown to be beneficial when used in the context of circuitry that may access the registers of the first type of transaction using both first and second transaction commands. In some embodiments, the registers of the first transaction type are mapped into a set of addresses associated with the second type of transaction by an offset, and both registers of the first and second transaction type are accessible via first and second transaction commands. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

Various local area networks (LANs) allow network devices of various manufacturers, such as network interface cards (NICs), hubs, bridges, routers, and switches, to communicate packetized data with each other in the LAN. The communications include access to memory, e.g., registers, in physical devices or circuits which may be in network modules of the LAN (e.g., via SMI as further described herein). The physical devices or circuits of devices, sometimes referred to as "PHYs," may use a register map for configuration, control, and status readout of associated registers. The PHYs are located on or include logic nodes. In many network modules, such as network modules in LANs, there are two types of logic nodes, a master logic node and slave logic nodes each coupled to a management communications bus. The master logic node manages access to the management communications bus and initiates the communications with the slaves over the management communications bus using a communications protocol. The slave logic nodes have an internal bus to couple internal PHYs and communicate over the management communications bus, with each slave logic node including one or more PHYs or subsystems. Each PHY has a corresponding port address such that each PHY is separately addressable. The communications protocol allows for different types of transactions communicated over the management communications bus. The different types of transactions have different commands used to access respective registers. As an example, a first type of transaction involves direct addressing in which the register address is included in the management frame field for the transaction. A second type of transaction involves indirect addressing in which two commands per transaction are used to access an arbitrary register(s) (and, optionally, with the next register being ready with one command using an address increment), the first including the register address and the second including the data to write or read. As a more specific example, the transaction types include Clause 22 commands and Clause 45 commands which are both associated with the Institute of Electrical and Electronic Engineer (IEEE) 802.3. Generally, registers for the first type of transaction, such as Clause 22 registers, are separately or independently mapped from registers of the second type of transaction, such as Clause 45 registers. Embodiments in accordance with the present disclosure are directed to apparatuses that access registers of the first type of transaction in response to commands in accordance with the second type of transaction. In specific embodiments, the registers of the first type of transaction are stored by an address offset, which moves the registers into the vendor-specific address space associated with addresses for the registers of the second type of transaction.

In specific embodiments and as described above, the different transaction types include Clause 45 and Clause 22 in accordance with IEEE 802.3. The IEEE 802.3 specification defines two PHY register maps, one for each of Clause 22 and Clause 45. There is a register map defined in IEEE 802.3 Clause 22 for generations of Ethernet PHYs which contain thirty-two registers that are directly accessed via the management communications bus (e.g., management data input/output (MDIO)). There is another register map defined in IEEE 802.3 Clause 45 that is used for other generations of Ethernet PHYs. This register map provides a larger register space than for Clause 22, which is sub-divided over multiple MDIO-managed devices (MMDs). Accessing the registers of these different Clauses requires different MDIO commands. For example, an MDIO access method for Clause 45 registers involves indirect addressing, which uses different MDIO commands than the access of Clause 22 registers which involves direct addresses. Both register maps include an IEEE-defined register address space and a vendor-specific register address space. Registers in the vendor-specific space can be assigned by the device manufacturer. Embodiments in accordance with the present disclosure allow for logic circuitry to use Clause 45 commands to access Clause 22 registers.

In accordance with various embodiments, Clause 22 registers are stored in the Clause 45 address space using an address offset, such that the stored Clause 22 registers are in the vendor-specific address space. An example offset is 0x8000, which stores the Clause 22 registers at the bottom thirty-two addresses of the vendor-specific address space. The offset, for example, re-maps direct addresses 0x00 through 0x1F onto indirect addresses 0x8000 through 0x801F. Note that Clause 45 supports separate address spaces per MMD, but Clause 22 does not support MMDs. As such, addressing the Clause 22 registers in the Clause 45 address space is made MMD agnostic and the Clause 22 registers may be accessed using any existing MMD. Clause 22 registers virtually exist only once per port address, such that writing a Clause 22 command using a first MMD and reading it back using a second MMD gives the same result as reading it back using the first MMD. The Clause 22 registers may be instantiated once, saving hardware cost. When accessing the Clause 22 registers using Clause 22 commands, the Clause 22 command is recognized, and the register address is shifted by the offset, sometimes herein referred to as "re-mapping," to access the corresponding Clause 22 registers mapped or stored in the Clause 45 address space using direct addressing and Clause 22 commands.

The IEEE 802.3 specification provides (indirect) access to Clause 45 registers using Clause 22 transactions. This is accomplished with Clause 22 registers 13 (0x0D) and 14 (0x0E). Register 13 contains a function (FUNC) to select address or data transaction types and contains a field to select an MMD (e.g., a DEVAD field). Register 14 is used for reading and writing an address or data for the MMD selected by register 13. This Clause 22 access mechanism to Clause 45 registers also provides a way to read the address pointers, because data/address and read/write can be independently selected here.

Specific embodiments are directed to an apparatus that includes a discernment logic circuit and logic circuitry. The discernment logic circuit and logic circuitry is at or forms part of one of the plurality of the logic nodes and/or a network-module device having one or more of the plurality of logic nodes of a network module, and each logic node includes one or more PHYs. The logic nodes may be associated with a network module in a LAN. The discernment logic circuit discerns whether a requested communications transaction received over the management communications bus involves a first type of transaction or a second type of transaction. The logic circuitry accesses, in response to discerning the requested communications transaction involves the second type of transaction, a register of a plurality of registers associated with the first type of transaction, wherein the plurality of registers associated with the first type of transaction are mapped into a set of addresses for the second type of transaction. The logic circuitry may use a register map that identifies the addresses of the registers of the first type of transaction as stored in the set of addresses for the second type of transaction.

More specifically, the logic circuitry accesses one of the registers associated with the first type of transaction and which is stored in the set of addresses for the second type of transaction in response to the requested communications transaction being in accordance with the second type of transaction and based on the register map. For example, the logic nodes include registers for the first type of transaction mapped into the set of addresses for the second type of transaction by an offset from another set of addresses for the first type of transaction. The offset includes a set value for each of the addresses of registers of the first type of transaction (e.g., 0x8000 to 0x801F).

The logic circuitry accesses the registers associated with the first type of transaction in response to a command associated with the first type of transaction and commands associated with the second type of transaction. For example, the logic circuitry is to re-map, in response to discerning another requested communications transaction involves the command associated with the first type of transaction, an address from the other requested communications transaction and associated with another set of addresses for the first type of transaction into the set of addresses for the second type of transaction (e.g., re-mapping Clause 22 register for Clause 22 transactions/commands). A number of embodiments are directed to methods of use the above described apparatuses, as further described herein.

Although the above and below describes an application for Ethernet Serial Management Interface (SMI), embodiments can be applied to other applications where a single interface is used to access multiple register maps with different transaction types, and one or more smaller register maps are mapped into a larger register map, in order to access registers of a smaller register map using transactions for a larger register map. Accordingly, embodiments are directed to Clause 22 registers mapped into the Clause 45 addresses and that the Clause 22 registers and Clause 45 registers may be accessed using both Clause 22 and Clause 45 commands.

Turning now to the figures, FIG. 1 illustrates an example apparatus, in accordance with the present disclosure. The apparatus is for use in a LAN that is characterized by a plurality of network modules that convey data over a physical communication channel, such as media-independent interface connections connecting the network modules. Network modules consisting of multiple devices may include a management communications bus for communicating among a plurality of logic nodes within the network module via a communications protocol. Although, one or more of the network modules of the LAN may not have a management communication bus, such as single device network modules. The communications protocol is compliant with an industry standard that defines an Ethernet-based LAN technology, such as IEEE 802.3. The apparatus, as shown by FIG. 1, may include or be associated with one of the plurality of network modules and/or one of the response logic nodes 102, 103, 104.

As shown, the network module 100 includes a plurality of logic nodes 102, 103, 104 and a management communication bus 105, 107 for communication among the plurality of logic nodes 102, 103, 104 in response to communications set over the management communications bus 105, 107. The management communications bus 105, 107 includes two lines, a clock line and data line, respectively referred to as the management data clock (MDC) 107 and the MDIO 105. MDC 107 provides a full-rate clock signal from the master logic node 102 to the slave logic nodes 103, 104 to drive and slice bits on MDIO 105 during frames. The clock signal may stop during idle. MDIO 105 is a bi-directional bus with a tri-state driver in each logic node 102, 103, 104 and restive pull-up on the bus. The management communications bus 107, 105 allows for addressing the logic nodes 102, 103, 104 by conveying addresses (e.g., port and register addresses) over the management communications bus 105, 107 using direct or indirect addressing, as further described herein. Various apparatus embodiments are directed to one of the logic nodes 102, 103, 104 (such as the master logic node 102 or one of the slave logic nodes 103, 104), more than one of the logic nodes, and/or the network module 100.

In a number of embodiments, two different types of logic nodes are connected to the management communications bus 105, 107, namely, slave logic nodes 103, 104 and a master logic node 102. The master logic node 102 generates the clock and initiates communications with the slave logic nodes 103, 104. The slave logic nodes 103, 104 receive the clock and respond when addressed by the master logic node 102. Although a single master logic node 102 and two slave logic nodes 103, 104 are illustrated, embodiments are not so limited and can include additional logic nodes or fewer logic nodes. The master logic node 102 is typically a microcontroller and is called a station management entity (STA) in the IEEE specification. The slave logic nodes 103, 104 are typically Ethernet PHYs, however SMI may also be used to manage other types of devices. In some network modules, such as with SMI, there is one master logic node and one or more slave logic nodes. However, embodiments are not so limited and other types of modules may include more than one master logic node and/or may not include master/slaves.

In a number of embodiments, the logic nodes may be devices or form part of a device 111, 113, such as a network-module device. A network-module device, as used herein, refers to or includes a device having MDIO connections to internal logic nodes (or a node) of the plurality of logic nodes of the network module. Each device 111, 113 may include one logic node or multiple logic nodes, with each logic node having one PHY, multiple PHYs and/or multiple subsystems. Although the slave logic nodes 103, 104 are illustrated on separate devices 111, 113 and the master logic node 102 is not illustrated on a device, embodiments are not so limited. For example, the master logic node 102 may be on the same device 111, 113 as the one slave logic nodes 103, 104. Further, the slave logic nodes 103, 104 may be on the same device, and not separate device.

One or more of the plurality of logic nodes 102, 103, 104 may include a PHY or multiple PHYs that connect to the data link layer, such as the medium access control (MAC) layer via a media independent interface (MII). A PHY may be a chip, which may include one or multiple PHYs. Larger chips may contain one or more PHY subsystems, each including one or more PHYs. A PHY includes or refers to an individual chip or circuit, as a part of a circuit assembly, or a subsystem (e.g., circuit) of a device (e.g., an SMI slave device having multiple PHYs, such as an IC). The PHYs are configured to implement physical layer functions. Each PHY has its own port address, and, in some embodiments, multiple PHYs are integrated into one device and/or a slave logic node (and/or, optionally, with multiple logic nodes on a device) having one shared SMI interface. Each PHY includes a physical coding sublayer (PCS), a physical media attachment layer (PMA) and/or a physical media dependent layer (PMD), as well as a media-dependent interface (MDI) that connects to the media (e.g., cable). The PMD is an interface between the PMA and the transmission medium through the MDI. The PMD receives serialized bits from the PMA and converts to the appropriate signals for the transmission medium (such as optical signals for a fiber optic line or electrical signals for a copper line), and vice versa. When transmitted to the PMA, the PCS encodes the data to be transmitted into the appropriate code group. When receiving the code groups from the PMA, the PCS decodes the code groups into the data format that can be understood and processed by upper layers. The MII carries signals between the physical layer and the data link layer, such as to a MAC controller. The MII may include a reduced media-independent interface (RMII), gigabit media independent interface (GMII), a reduced gigabit media independent interface (RGMII), serial gigabit media-independent interface (SGMII), quad serial gigabit media-independent interface (QSGMII), and 10-gigabit media-independent interface (XGMII), among others.

The logic nodes 102, 103, 104 (e.g., the PHYs internal to the logic nodes) may include registers associated with different types of transactions. The different types of transactions are both compliant with the same communications protocol, and include different types of addressing and corresponding commands. For example, the first type of transaction includes direct addressing and the second type of transaction includes indirect addressing. For direct addressing, the address (e.g., the port address and register address) is included in the command with the instruction for the transaction. As such, the direct addressing may include one command that has the address and the data. For indirect addressing, the address (e.g., the register address) is held in an intermediate location that is looked-up for the instruction for the transaction. For indirect addressing, two commands are used, with the first including the address part (e.g., register address) and the second including the data part. The first type (e.g., Clause 22) of transaction may provide access to up to N registers in each of M plurality of logic nodes, N and M being positive integers, and the second type of transaction (e.g., Clause 45) may provide access to a plurality of registers in each of the one of the plurality of logic nodes that is greater than N.

In accordance with various embodiments, one or more of the logic nodes 102, 103, 104 access registers of the first transaction type (e.g., Clause 22 registers) in response to or using commands associated with the second transaction type (e.g., Clause 45 commands). As previously described, generally registers of the first transaction type are stored in a memory space that is different than the second transaction type, and are separately mapped. That is, the registers of the second type of transaction are associated with a set of addresses (e.g., indirect addresses) and the registers of the first type of transaction are associated with another set of addresses (e.g., direct addresses). In accordance with various embodiments, the registers of the first transaction type are stored by an offset such that the registers of the first transaction type are stored in the set of addresses for the second transaction type, which may be referred to as mapping direct addresses onto indirect addresses.

As an example, the logic node 104 includes discernment logic circuit 106 and logic circuitry 108. The logic node 104 may form part of a device 113. Although the logic node 104 is illustrated by FIG. 1 as a slave logic node forming part of the device 113, embodiments are not so limited and the device 113 may include multiple logic nodes, such as the logic node 104 and the master logic node 102. In some embodiments, there may be one discernment circuit 106 per network-module device (in instances in which a device includes multiple modules) and in other embodiments, each or more than one of the slave logic nodes of a network-module device or a network module includes a discernment circuit 106. As a specific example, there is a discernment circuit per slave logic node.

The discernment logic circuit 106 discerns whether a requested communications transaction received over the management communications bus 105, 107 from another of the plurality of logic nodes (e.g., if referring to logic node 104, the other nodes are logic nodes 102, 103) involves the first type of transaction or the second type of transaction. As previously described, the second type of transaction has a plurality of commands associated with the requested communications transaction used to convey different parts of the communications transaction including an address part and a data part, as further illustrated herein.

The logic circuitry 108 of the logic node 104 accesses, in response to discerning that the requested communications transaction involves the second type of transaction (e.g., the plurality of commands having an address part and data part), a register of a plurality of registers associated with the first type of transaction, with the plurality of registers of the first type of transaction being mapped into the set of addresses for the second type of transaction and the register being associated with the address part of the communications transaction (e.g., Clause 22 registers mapped into Clause 45 space). More specifically, the communications transaction is communicated using the plurality of commands associated with the second type of transaction (e.g., Clause 45) for a register associated with the first type of transaction (e.g., Clause 22). The logic node 104 includes registers of the first type of transaction mapped into the set of addresses for the second type of transaction (e.g., indirect addresses) by an offset from the other set of addresses for the first type of transaction (e.g., direct addresses). The offset includes a set value for each of the registers of the first type of transaction, such as 0x8000 to 0x801F. For example, the set value is for each of the registers of the first type of transaction.

The logic circuitry 108 supports access to registers associated with the set of addresses for the second type of transaction and to registers associated with the other set of addresses for the first type of transaction in response to commands associated with the second type of transaction and using the register map (e.g., Clause 45 transactions used to access both Clause 22 and Clause 45 registers). Additionally, the logic circuitry 108 may access the registers associated with the other set of addresses for the first type of transaction in response to commands associated with the second type of transaction and in response to commands associated with the first type of transaction using the register map (e.g., access Clause 22 registers using either Clause 22 commands or Clause 45 commands). The logic circuitry 108, in response to discerning another requested communications transaction involves the command associated with the first type of transaction, re-maps an address from the other requested communications transaction, which is associated with the other set of addresses for the first type of transaction (e.g., Clause 22 request for Clause 22 register that is mapped into the indirect addresses), to the set of addresses for the second type of transaction. More specifically, the logic circuitry 108 may re-map the address using the offset value to access the registers of the first type of transaction (which are mapped to the Clause 45 space) in response to commands for the first type of transaction, such as by mapping the address in the command to an address associated with the second type of transaction. In such embodiments, the discernment logic circuit 106 discerns that the requested transaction involves the command associated with the first transaction type and, in response, the logic circuitry 108 re-maps the address in the requested communications transaction.

As described above, the logic node 104 accesses registers of the first type of transaction in response to commands in accordance with the first type of transaction and the second type of transaction using the register map. The logic circuitry 108 provides access to a register of the one of the plurality of logic nodes 104 associated with the first type of transaction (e.g., Clause 22) that is MMD number agnostic. Additionally, the logic circuitry 108 may instantiate up to N registers on the one of the plurality of logic nodes once per port address.

Figure 5:
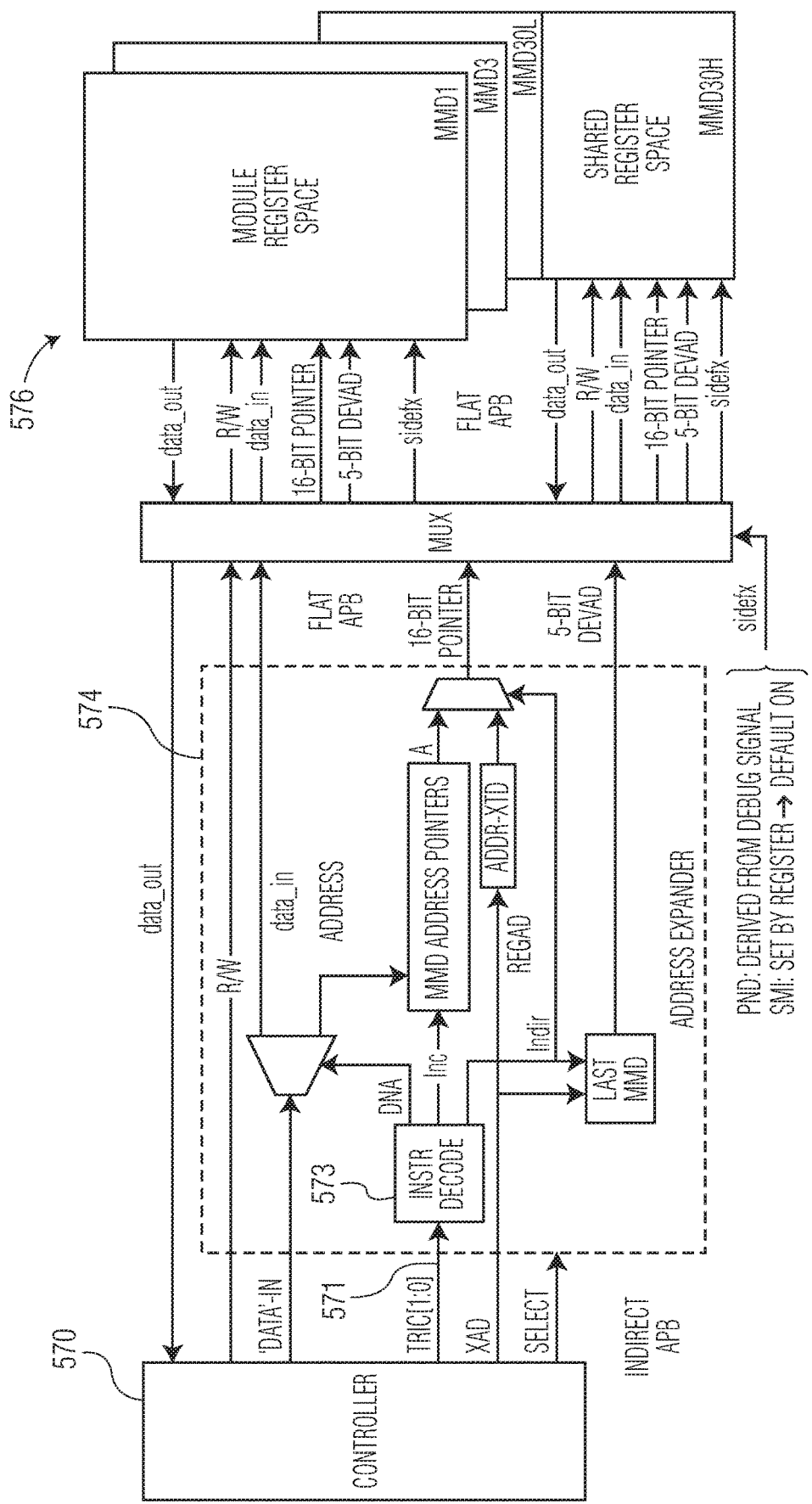
FIG. 5 illustrates example components of a logic node, in accordance with the present disclosure.

In specific embodiments, as further illustrated by FIG. 5, a Transaction Instruction Code (TRIC) is used by the apparatus, such as by the SMI controller of the slave logic node. TRIC is a code that conveys the different types of SMI transactions over the internal interface, including address, data indirect, data with address increment, and data direct. TRIC may be used on the internal advanced peripheral bus (APB) between the SMI (slave) controller and the registers and also on the other interfaces that may access the same registers.

FIGS. 2A-2D illustrate example circuitry and commands of the first and second type of transaction for an apparatus, in accordance with the present disclosure. The apparatus may access registers of two different types of transactions in response to or using commands for the either type of transaction. The first type of transaction provides access to a first plurality of registers in each of the plurality of logic nodes using a command which, generally, is associated with or involves direct addressing. The second type of transaction provides access to a second plurality of registers in each of the plurality of logic nodes using a plurality of commands which, generally, are associated with or involve indirect addressing. The second plurality of registers are associated with a set of addresses and include the first plurality of registers. The first plurality of registers are associated with another set of addresses for the first type of transaction which are mapped into the set of addresses for the second type of transaction by an offset value from the other set of addresses for the first type of transaction. The logic circuit (e.g., via logic circuitry) accesses registers of the first transaction type in response to commands for the first transaction type by re-mapping addresses in the commands of the data frame using the offset value.

For ease of reference, the registers associated with the first type of transaction and the other set of addresses are herein referred to as "Clause 22 registers" and the first type of transaction and other set of addresses are generally referred to as a "Clause 22 transaction" and "Clause 22 addresses." Similarly, for ease of reference, the registers associated with the second type of transaction are herein referred to as "Clause 45 registers" and the set of addresses are generally referred to as a "Clause 45 transaction" and "Clause 45 addresses." Although embodiments are not limited to Clause 22 and Clause 45 transactions, and may include other industry standards.

Figure 2A:
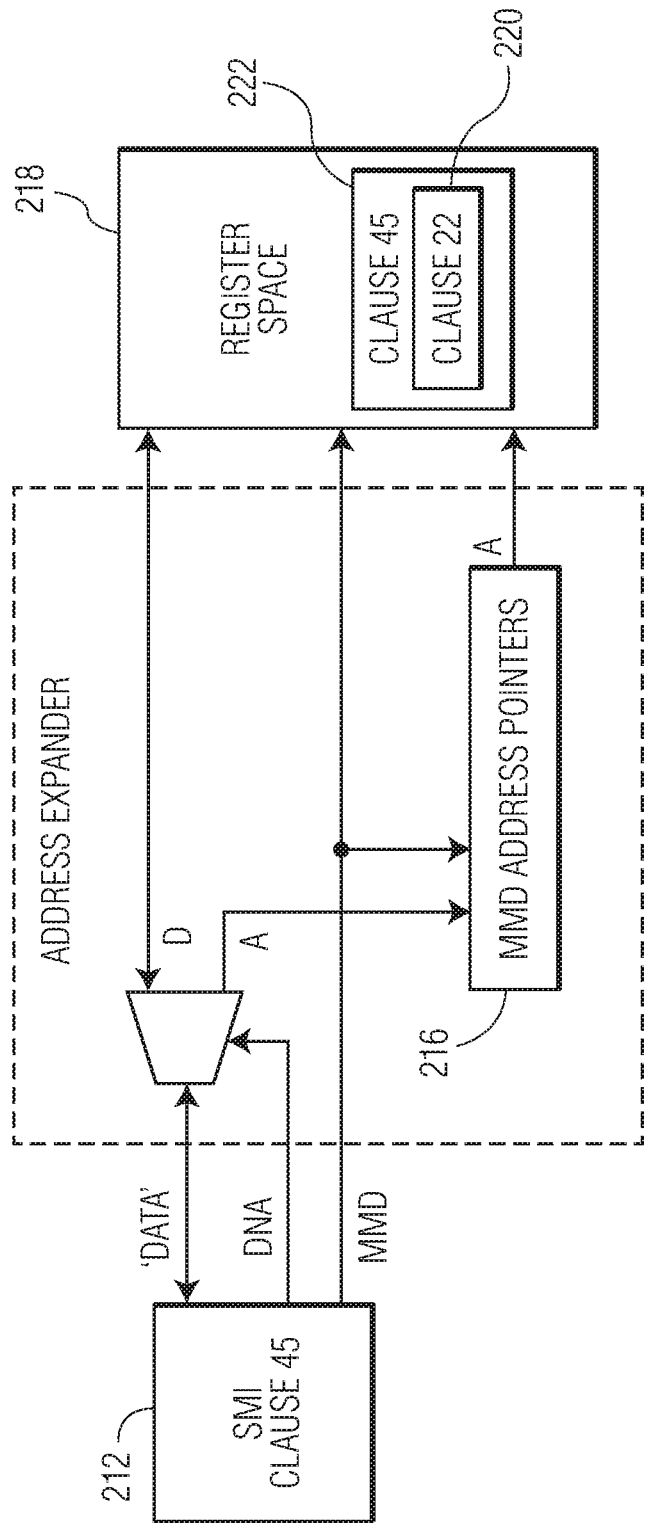
Figure 2B:
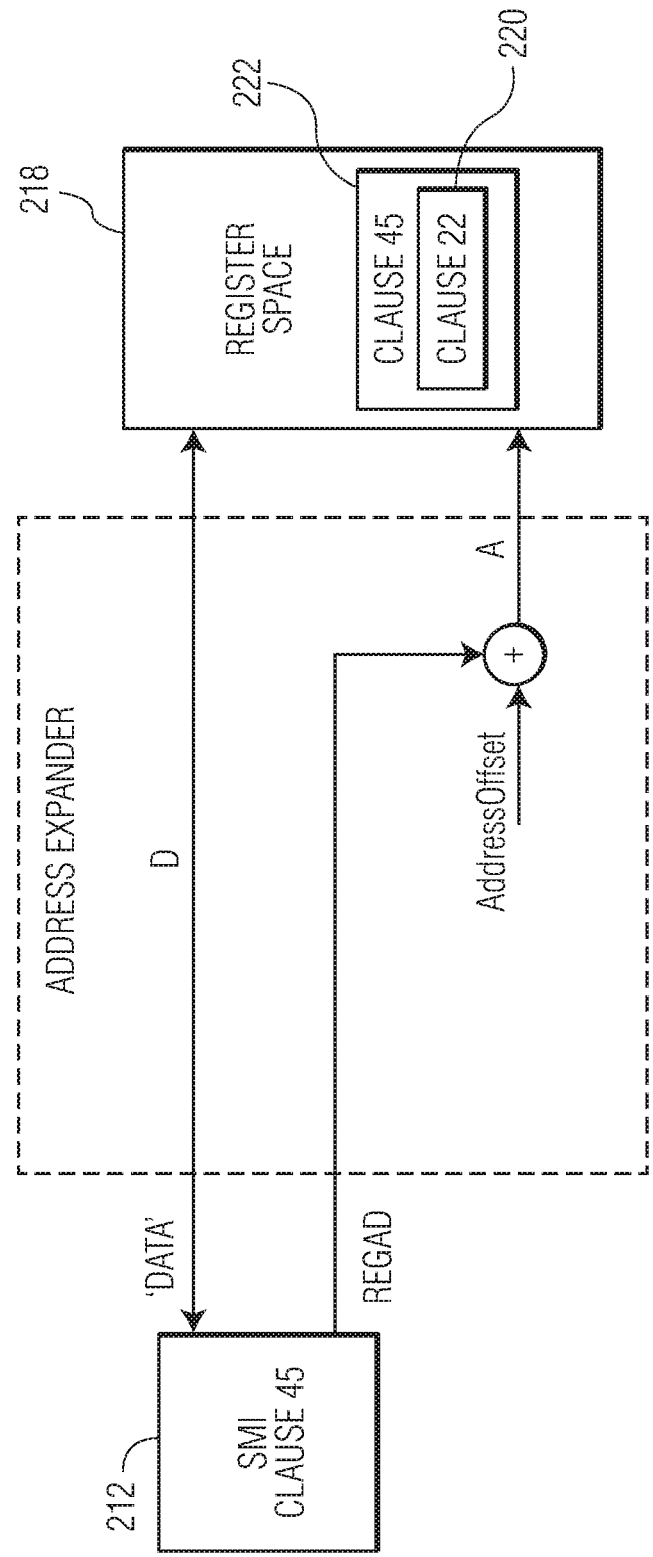

FIG. 2A illustrates, for example, processing by the discernment logic circuit and the logic circuitry of a logic node, such as the logic node 104 illustrated by FIG. 1, and in response to a Clause 45 transaction. The logic node may interpret both Clause 22 and Clause 45 commands to access Clause 22 registers 220 and Clause 45 registers 222. The logic node may discern whether the transaction is a Clause 22 command or a Clause 45 command (or commands), such as by using an SMI controller 212. The SMI controller 212, which may include or be the previously described discernment logic circuit and that forms part of the network device and/or a slave logic node, discerns whether the requested communication transaction is a Clause 22 transaction involving direct addressing or a Clause 45 transaction involving indirect addressing. In response to a Clause 45 transaction, the SMI controller 212 determines whether the command includes the address part or the data part (e.g., via the illustrated address expander). If the command includes the address part, the register address is stored in the address register 216. If the command includes the data part, the previously stored address is used to access a register in the register space 218 that is uniquely identified by the address, and to either write data to the register or read data from the register. The SMI controller 212 illustrated by FIGS. 2A-2B is a function internal to a slave logic node that translates SMI transactions to internal register transactions. There may be one SMI controller per device, such as per slave logic node or per network-module device, in some specific embodiments.

As previously described, the register space 218 includes Clause 22 registers 220 mapped into the Clause 45 addresses by an offset from the Clause 22 addresses. As such, both the Clause 22 registers 220 and the Clause 45 registers 222 may be accessed using Clause 45 commands and using a register map that maps the Clause 22 registers addresses by the offset to the Clause 45 register addresses. Clause 22 registers 220 and the Clause 45 registers 222 may be accessed using Clause 22 commands and a mechanism provided by the Clause 22 standard.

FIG. 2B illustrates, for example, processing by the discernment logic circuit and the logic circuitry of a logic node, such as the logic node 104 illustrated by FIG. 1 and in response to a Clause 22 transaction. The logic node may discern whether the transaction is a Clause 22 transaction, such as by using an SMI controller 212. In response to a Clause 22 transaction and for accessing a Clause 22 register, the SMI controller 212 re-maps the address in the Clause 22 command to the Clause 45 register addresses using the register map and/or the offset. For Clause 45 registers, access is provided to the Clause 45 registers 222 using Clause 22 commands and Clause 22 registers 13 (0x0D) and 14 (0x0E). Register 13 contains a FUNC to select address or data transaction types and contains a DEVAD field to select MMD. Register 14 is used for reading and writing an address or data for the MMD selected by register 14.

FIG. 2C illustrates example Clause 22 data frames and the respective frame fields, which may be used by various logic nodes for accessing registers. As previously described, Clause 22 transactions involve direct addressing. Specifically shown is two example data frames 224, one for a read operation and another for a write operation in accordance with Clause 22 of IEEE 802.3. The frame fields in the data frames 224 include:

PRE: a preamble frame field which is "1" for thirty-two clock cycles

ST: start-of-frame, which is fixed to "01"

OP: operation code which identifies read or write operation (with 10 include read and 01 including write)

PHYAD: a five bit (PHY) port address

REGAD: a five bit register address

TA: turn-around (hand over for read and filler for writes)

DATA: sixteen bit register value (e.g., data).

FIG. 2D illustrates example Clause 45 data frames and the respective frame fields, which may be used by various logic nodes for accessing registers. As previously described, Clause 45 transactions involve indirect addressing. Specifically shown is four example data frames 226, the first for an address part of a read or write transaction, the second for a read operation, the third for a write operation, and the fourth for post-read increment addressing in accordance with Clause 45 of IEEE 802.3. The frame fields in the data frame include:

PRE: a preamble frame filed which is "1" for thirty-two clock cycles

ST: start-of-frame, which is fixed to "00"

OP: operation code which identifies address, read or write operation (with 00 being write an address, 10 including read, 01 including write, and 11 including read and increment address)

PRTAD: a five bit (PHY) port address

DEVAD: a five bit MDIO-manage device (MMD) number

DATA: sixteen bit address or register value (e.g., data).

The ST identifies whether the transaction is a Clause 22 or Clause 45 transaction. For a Clause 45 transaction, the address is not included in the data/write commands. The address can be selected per MMD and is set by a separate (address) command. The data read/write operations are directed to this address. The address space for Clause 45 is sixteen bit wide (e.g., 65536 registers).

Figure 3:
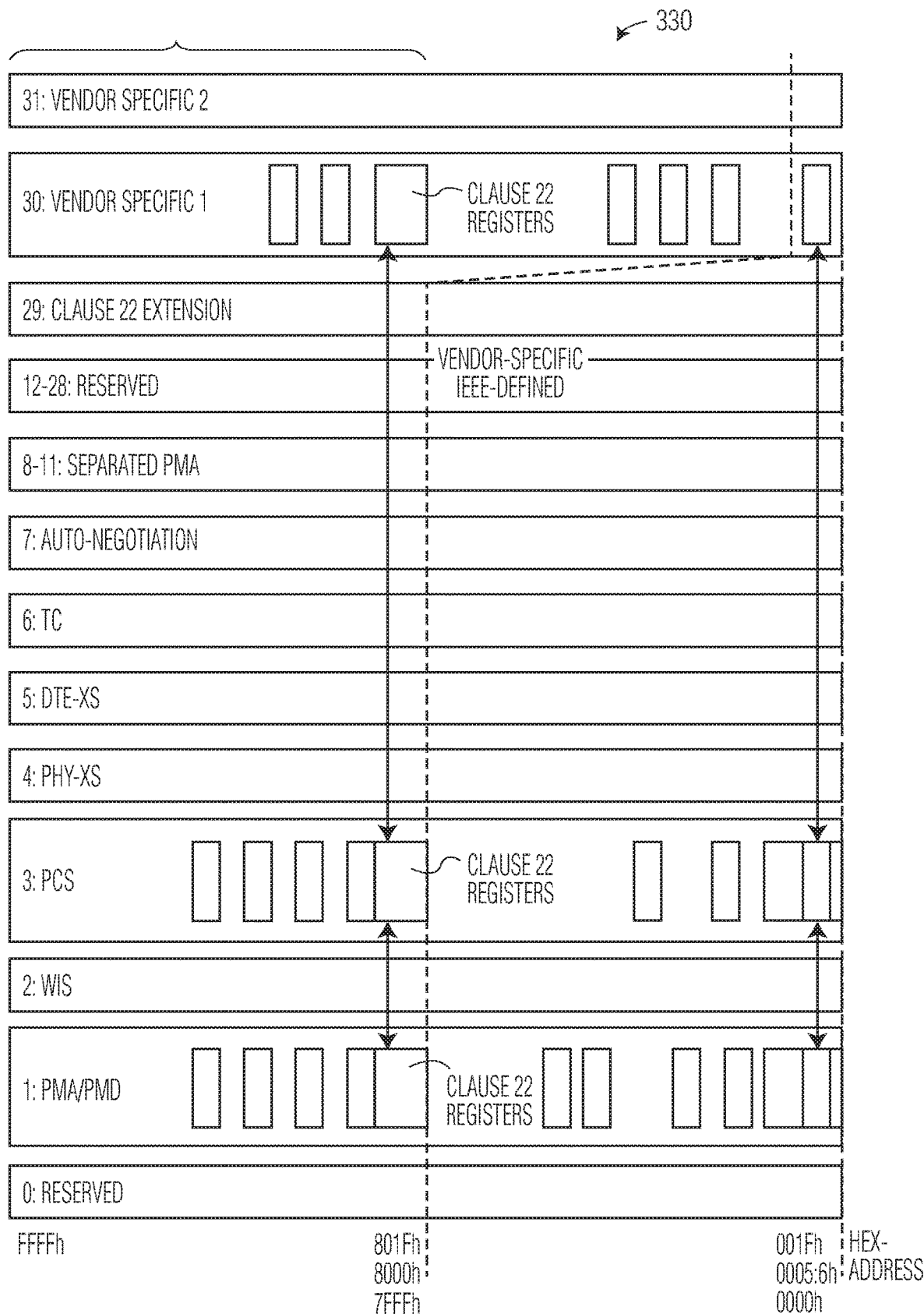
FIG. 3 illustrates an example register map, in accordance with the present disclosure.

FIG. 3 illustrates an example register map, in accordance with the present disclosure. As shown by the register map 330, the Clause 22 registers are mapped into the Clause 45 set of addresses (e.g., 8000:801fh). The Clause 22 registers are equal for all present MMDs/DEVAD, but may be instantiated once (e.g., physically stored once). The Clause 22 register 14 (Eh) may not exist but its address E is used. Clause 13 (Dh) may be physically located in the SMI controller for fast selection. The register map may, for example, be stored on the logic nodes (e.g., each PHY has a register map).

In the specific embodiment of FIG. 3, the Clause 45 address space has thirty-two MMDs (max) with 16-bit address space each. There are at least three MMDs present in each PHY (1:PMA, 3:PCS, 30:entity or manufacturer specific). The upper half of MMD address space is vendor-specific, and which includes MMD 30/31 and the MSB of 16-bit address selects between IEEE/entity-specific register space. The Clause 22 registers are mapped into Clause 45 vendor-specific space with the address range 8000h:801F (8000h+original addresses→MSB=1).

As described above, Clause 45 provides indirect register access using address pointers to select a register within an MMD. Address pointers cannot be read-back by Clause 45 transactions as there is no 'read address' transaction type. Clause 45 registers may also be accessed using Clause 22 commands and a method provided by Clause 22 registers 13 and 14, e.g., 0x0D and 0x0E. If a master logic node and slave logic node support Clause 22 and Clause 45 transactions, and the slave uses a Clause 45 register map, the master can read the Clause 45 address pointers, using the Clause 22 transaction.

Figure 4:
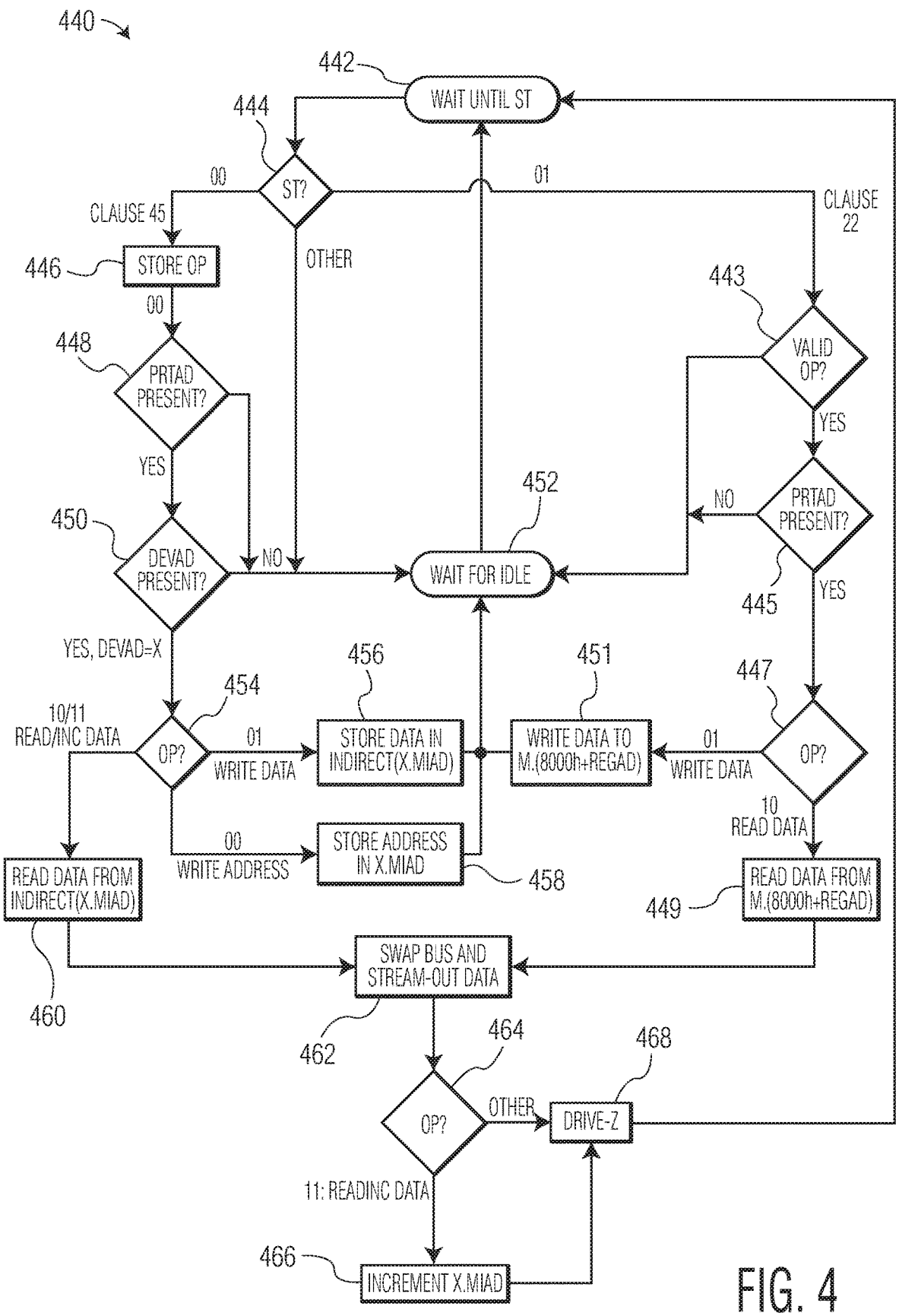
FIG. 4 illustrates example data flow for an apparatus, in accordance with the present disclosure.

FIG. 4 illustrates example data flow for an apparatus, in accordance with the present disclosure. Any of the above described apparatuses may be used to implement the data flow 440 illustrated by FIG. 4, such as via an SMI controller of a logic node. At 442, the logic node listens to the management communication bus and waits for the end of an idle cycle and/or for a start (e.g., ST) of a data frame being communicated over the management communication bus (e.g., waits for end of PRE/IDLE). In some embodiments, waiting for ST includes waiting for a preamble, however embodiments are not so limited. In response to a ST, at 444, the logic node discerns whether the data frame is a Clause 22 transaction or a Clause 45 transaction based on the start-of-frame (ST) in the data frame. In response to discerning the transaction is a Clause 45 transaction, at 446, the logic node stores the operation code (OP), which includes an address part of the transaction. As previously described, the Clause 45 transaction may indicate Clause 22 registers (which are mapped into the Clause 45 addresses) and/or Clause 45 registers. At 448, the logic node determines if a port address is present. If not, the logic node, at 452 waits for an idle state or cycle, sometimes referred to as "z," and at 442, listens for another ST. If the port address is present, at 450, the logic node determines if the MMD number is present. If not, the logic node at 452 waits for z, and at 442, listens for another ST. If the MMD number is present, at 454, the logic node discerns the OP. If the OP indicates to read data and/or read data and increment address, at 460, reads data from the indirectly accessed registers address and, at 462, swaps bus and streams-out data. At 464, the logic node discerns if the requested transaction is with or without an address increment. If the further OP includes an increment of the address (e.g., read/inc data), the logic node, at 466, increments the register address in the address register (e.g., X.MIAD), drives z, at 468, and then listens for another ST, at 462. If not or it includes some other OP, the logic node drives z, at 468 and listens for another ST, at 462.

If the OP indicates to write data, the data is stored at the indirectly accessed register address, at 456. If the OP indicates to write a register address, the register address is stored in the address register (e.g., X.MIAD), at 458. The logic node then waits for z, at 452, and continues to listen for another ST, at 442.

In response to discerning the transaction is a Clause 22 transaction, at 443, the logic node determines if the OP is valid. If the OP is not valid, the logic node, at 452 waits for z and at 442, listens for the ST. If the OP is valid, the logic node determines if the port address is present, at 445. If not, the logic node at 452 waits for z, and at 442, listens for the ST. If the port address is present, at 447, the logic node discerns the OP. If the OP indicates to read data, at 449, the logic node reads data from the directly accessed register address that is re-mapped by the offset and, at 462, swaps bus and streams-out data. As previously described, to access Clause 22 registers using Clause 22 commands, the Clause 22 address (e.g., REGAD) in the command is re-mapped to the Clause 45 address space by the offset value. At 464, the logic node discerns if the requested transaction is with or without an address increment. If the further OP includes an increment of the address (e.g., read/inc data), the logic node, at 446, increments the register address in the address register (e.g., X.MIAD), drives z, at 468, and then listens for another ST, at 462. If not or it includes some other OP, the logic node drives z, at 468 and listens for another ST, at 462. The Clause 22 registers may thereby be accessed using direct addressing and indirect addressing.

If the OP indicates to write data, the data is stored at the directly accessed register address, at 451, which is remapped as indicated above. The logic node then waits for z, at 452, and continues to listen for another ST, at 442.

FIG. 5 illustrates example components of a logic node, in accordance with the present disclosure. For example, the logic node may form part of a device, e.g., a network-module device, having one or more logic nodes, and each logic node including one or more PHYs and/or subsystems, as described above. In other embodiments, the logic node is a device and has one or more PHYs or subsystems. The logic node includes a management controller 570, such as an SMI controller. As previously described in connection with FIGS. 2A-2B, an SMI controller is a function internal to the slave logic node that translates SMI transactions to internal register transactions. There may be one SMI controller per device or per slave logic node, in some specific embodiments. However, embodiments are not limited to SMI, and the controller can be associated with other types of interfaces and/or with multiple interfaces, such as SMI and ABP. An address expander 574 (such as also illustrated by FIGS. 2A-2B) may process first and/or second types of transactions by identifying the location of the addressed register in the register space 576 in response to the management controller 570.

In specific embodiments, a TRIC 571 is used by the apparatus, such as by the SMI controller of the slave logic node. TRIC is a code that conveys the different types of SMI transactions over the internal interface, including address, data indirect, data with address increment, and data direct. TRIC may be used on the internal APB between the controller 570 (e.g., SMI slave controller) and the registers 576 and also on the other interfaces that may access the same registers 576 (e.g., the illustrated ABP). As shown, the TRIC 571 is provided from the management controller 570 to the instruction decode circuit 573 that may decodes the TRIC 571.

The above-described apparatuses may be used to implement a variety of methods. An example method is for use within a LAN characterized by a plurality of network modules configured to convey data over a physical communication channel and with each of the network modules including a management communications bus for communication among a plurality of logic nodes in response to communications sent over the management communications bus via a communications protocol. The method includes communicating over the management communication bus among the plurality of logic nodes. The method further includes, at one of the plurality of logic nodes, discerning whether a requested communications transaction received over the management communications bus from another of the plurality of logic nodes involves a first transaction type or a second transaction type, and accessing (e.g., using a register map), in response to discerning that the requested communication transaction involves (the plurality of commands of) the second type of transaction, a register of the plurality of registers associated with the first type of transaction and based on the address part of the communications transaction, wherein the plurality of registers associated with the first type of transaction are mapped into a set of addresses for the second type of transaction. As previously described, the second type of transaction is different than the first type in that the second type permits for more registers to be accessed within the one of the plurality of logic nodes.

In specific embodiments, the method further includes re-mapping, in response to discerning that the requested communications transaction involves (a command of) the first type of transaction, an address in the requested communications transaction to the set of addresses for the second type of transaction, the address being associated with another set of addresses for the first type of transaction.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry which may be illustrated as or using terms such as blocks, modules (e.g., network modules), device, system, unit, controller, and/or other circuit-type depictions (e.g., reference numerals 100, 106, 108, and 212 of FIGS. 1 and 2A depict a block/module as described herein). Such circuits or circuitry are used together with other elements to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in FIGS. 2B-3 and 4. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described at FIG. 4 is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. For instance, the register map 330 illustrated by FIG. 3 may be implemented or stored by the logic node 104 illustrated by FIG. 1. As another example, the apparatus illustrated by FIG. 1 may implement the process illustrated by FIG. 4. Such modifications do not depart from the true spirit and scope of various aspects of the disclosure, including aspects set forth in the claims.

What is claimed is:

1. An apparatus for a local area network characterized by a plurality of network modules configured to convey data over a physical communication channel and with at least one of the network modules including a management communications bus for communication among a plurality of logic nodes via a communications protocol, the apparatus comprising one or more of the plurality of logic nodes and the one or more of the plurality of logic nodes including, a discernment logic circuit to discern whether a requested communications transaction received over the management communications bus from another of the plurality of logic nodes involves a first type of transaction or a second type of transaction, the second type of transaction having a plurality of commands to convey respectively different parts of the requested communications transaction including an address part and a data part, and the second type of transaction being different than the first type in that the second type permits for more registers to be accessed within the one of the plurality of logic nodes; and logic circuitry to access, in response to discerning that the requested communications transaction involves the second type of transaction, a register of a plurality of registers associated with the first type of transaction, wherein the plurality of registers associated with the first type of transaction are mapped into a set of addresses for the second type of transaction, wherein the registers of the first type of transaction are stored by a specific address offset to provide an effective shift and storage of the registers into a vendor-specific address space associated with addresses for the registers of the second type of transaction for enabling access of the registers of the first type of transaction via the second type of transaction, and wherein the first type of transaction is to use direct-addressing commands for accessing the registers of the first type of transaction whereas the second type of transaction is to use indirect-addressing commands for accessing the registers of the second type of transaction.

2. The apparatus of claim 1, the apparatus further including the management communications bus for communication among the plurality of logic nodes, wherein respective addresses for the plurality of logic nodes are conveyed using the management communications bus, wherein the first type of transaction is to provide access to up to N registers in each of the plurality of logic nodes, N being a positive integer, and the second type of transaction is to provide access to a plurality of registers in each of the one of the plurality of logic nodes that is greater than N.

3. The apparatus of claim 1, wherein the logic circuitry is to support access to a plurality of registers associated with the second type of transaction and to the plurality of registers associated with the first type of transaction and with another set of addresses, the plurality of registers associated with the first type of transaction being stored in the set of addresses for the second type of transaction.

4. The apparatus of claim 1, wherein the one of the plurality of logic nodes includes the plurality of registers for the first type of transaction mapped into the set of addresses for the second type of transaction by an offset from another set of addresses associated with the first type of transaction, wherein the offset is to store the registers of the first type of transaction at the bottom thirty-two addresses of the vendor-specific address space.

5. The apparatus of claim 4, wherein the offset includes a set value of 0x8000 for each of the plurality of registers of the first type of transaction.

6. The apparatus of claim 1, wherein the logic circuitry is to access the plurality of registers associated with the first type of transaction in response to a command associated with the second type of transaction and in response to a plurality of commands associated with the first type of transaction.

7. The apparatus of claim 6, wherein the logic circuitry is to re-map, in response to discerning another requested communications transaction involves the command associated with the first type of transaction, data from an address of the another requested communications transaction and associated with another set of addresses for the first type of transaction to the set of addresses for the second type of transaction.

8. The apparatus of claim 1, further including the plurality of logic nodes, wherein the plurality of logic nodes includes a master logic node and at least one slave logic node, the discernment logic circuit is part of the at least one slave logic node, and each of the first type and the second types of transactions are associated with the communication protocol that is compliant with an industry standard that defines an Ethernet-based local area network (LAN) technology.

9. The apparatus of claim 1, wherein the discernment logic circuit is further to discern whether the requested communications transaction involves the second type of transaction and a register map that includes an address of another set of addresses for the plurality of registers of the first type of transaction mapped into the set of addresses for the second type of transaction, wherein the first type of transaction is to provide access to up to N registers in each of the plurality of logic nodes, N being a positive integer, and the second type of transaction is to provide access to a plurality of registers in each of the one of the plurality of logic nodes that is greater than N.

10. An apparatus for a local area network characterized by a plurality of network modules configured to convey data over a physical communication channel and with each of the plurality of network modules including a management communications bus for communication among a plurality of logic nodes via a communications protocol, the apparatus comprising at one of the plurality of logic nodes, a discernment logic circuit to discern whether a requested communications transaction received over the management communications bus from another of the plurality of logic nodes involves a first type of transaction or a second type of transaction, the second type of transaction having a plurality of commands to convey respectively different parts of the requested communications transaction including an address part and a data part, the second type of transaction being different than the first type in that the second type permits for more registers to be accessed within the one of the plurality of logic nodes; and logic circuitry to
access, in response to discerning that the requested communications transaction involves the plurality of commands associated with the second type of transaction, a register of a plurality of registers associated with the first type of transaction, wherein the plurality of registers associated with the first type of transaction are mapped into a set of addresses for the second type of transaction; and re-map, in response to discerning that the requested communications transaction involves a command associated with the first type of transaction, an address from the requested communications transaction, the address being associated with another set of addresses for the first type of transaction, to the set of addresses for the second type of transaction, wherein the registers of the first type of transaction are stored by a specific address offset to provide an effective shift and storage of the registers into a vendor-specific address space associated with addresses for the registers of the second type of transaction for enabling access of the registers of the first type of transaction via the second type of transaction, and wherein the first type of transaction is to use direct-addressing commands for accessing the registers of the first type of transaction whereas the second type of transaction is to use indirect-addressing commands for accessing the registers of the second type of transaction.

11. The apparatus of claim 10, wherein logic circuitry is further to provide access to the register of the one of the plurality of logic nodes associated with the first type of transaction that is management data input/output-managed device (MMD) number agnostic, and wherein the offset is to store the registers of the first type of transaction at the bottom portion of the addresses of the vendor-specific address space.

12. The apparatus of claim 10, wherein the first type of transaction is to provide access to up to N registers in each of the plurality of logic nodes, N being a positive integer, and the logic circuitry is to instantiate the N registers on the one of the plurality of logic nodes once per port address.

13. The apparatus of claim 10, wherein the first type of transaction is to provide access to a first plurality of registers in each of the plurality of logic nodes using a command which includes the address, the first plurality of registers being associated with the another set of addresses, and the second type of transaction is to provide access to a second plurality of registers in each of the plurality of logic nodes using the plurality of commands, the second plurality of registers being associated with the set of addresses and including the first plurality of registers mapped into the set of addresses from the other set of addresses.

14. The apparatus of claim 13, wherein the first plurality of registers for the first type of transaction are mapped into the set of addresses for the second type of transaction by an offset value from the other set of addresses for the first type of transaction.

15. The apparatus of claim 14, wherein the offset value includes a set value for each of the registers of the first type of transaction and the logic circuitry is to re-map the address using the offset value.

16. The apparatus of claim 10, wherein the discernment logic circuit includes a management controller to provide a Transaction Instruction Code (TRIC) that conveys different types of transactions over an internal interface of the logic node to registers.

17. A method for use within a local area network characterized by a plurality of network modules configured to convey data over a physical communication channel and with each of the network modules including a management communications bus for communication among a plurality of logic nodes via a communications protocol the method comprising:

communicating over the management communication bus among the plurality of logic nodes;
at one of the plurality of logic nodes:
discerning whether a requested communications transaction received over the management communications bus from another of the plurality of logic nodes involves a first type of transaction or a second type of transaction, the second type of transaction having a plurality of commands to convey respectively different parts of the requested communications transaction including an address part and a data part, the second type of transaction being different than the first type in that the second type permits for more registers to be accessed within the one of the plurality of logic nodes; and
accessing, in response to discerning that the requested communication transaction involves the plurality of commands of the second type of transaction, a register of a plurality of registers associated with the first type of transaction and based on the address part of the communications transaction, wherein the plurality of registers associated with the first type of transaction are mapped into a set of addresses for the second type of transaction, wherein the registers of the first type of transaction are stored by a specific address offset to provide an effective shift and storage of the registers into a vendor-specific address space associated with addresses for the registers of the second type of transaction for enabling access of the registers of the first type of transaction via the second type of transaction, and wherein the first type of transaction is to use direct-addressing commands for accessing the registers of the first type of transaction whereas the second type of transaction is to use indirect-addressing commands for accessing the registers of the second type of transaction.

18. The method of claim 17, further including re-mapping, in response to discerning that the requested communications transaction involves a command of the first type of transaction, an address in the requested communications transaction to the set of addresses for the second type of transaction, the addresses being associated with another set of addresses for the first type of transaction.

19. The method of claim 17, wherein the plurality of registers for the first type of transaction are mapped into the set of addresses for the second type of transaction by an offset value from another set of addresses for the first type of transaction, wherein the offset is to store the registers of the first type of transaction at the bottom addresses of the vendor-specific address space.

20. The method of claim 19, wherein the offset value includes a set value for each of the plurality of registers of the first type of transaction.

* * * * *